UNITED STATES PATENT OFFICE.

JOHN REICHEL, OF PHILADELPHIA, AND HENRY WERNER, OF NORWOOD, PENNSYLVANIA, ASSIGNORS TO H. K. MULFORD COMPANY, OF PHILADELPHIA, PENNSYLVANIA, A CORPORATION OF PENNSYLVANIA.

PROCESS OF TREATING HOG-CHOLERA ANTITOXIN.

1,224,860.      Specification of Letters Patent.      Patented May 1, 1917.

No Drawing.      Application filed January 19, 1917. Serial No. 143,276.

*To all whom it may concern:*

Be it known that we, JOHN REICHEL, a citizen of the United States, residing at Philadelphia, county of Philadelphia, State of Pennsylvania, and HENRY WERNER, a subject of Great Britain, residing at Norwood, in the county of Delaware and State of Pennsylvania, have invented a new and useful Improvement in the Process of Treating Hog-Cholera Antitoxin, of which the following is a specification.

This invention relates to a new and useful process of treating hog cholera antitoxin to obtain the plasma or serum free of living germs or bacteria and foot-and-mouth disease virus, in which treatment the plasma from the whole blood or the serum from the whole blood or the serum from defibrinated blood of hyperimmune hogs is prevented from coagulating when the plasma or serum is heated for a sufficient length of time and at a temperature to kill germs or bacteria and foot-and-mouth disease virus. In carrying out the process defibrinated blood plasma or serum obtained in one way or another may be similarly treated, and therefore, the process in practice is not to be considered as restricted to any particular defibrinated blood, plasma or serum.

Hog cholera antitoxin made in accordance with Dorset specification of Letters Patent No. 823,110, patented June 12, 1906, results in a product of the nature of defibrinated blood, plasma or serum. All three may be prepared from the whole blood as obtained from hyperimmunized animals treated by injections of virulent blood or virus, from a hog sick of hog cholera or the cause of hog cholera, producing in the blood of the treated animal antibodies or hog cholera antitoxin.

The serum portion alone includes the immune or antibodies of the hog cholera antitoxin, and the serum portion may be obtained from the whole blood antitoxin by the process of treating hog cholera antitoxin described in the specification of Reichel and Werner Letters Patent, No. 1,183,591, patented May 16, 1916, or it may be obtained from plasma or the defibrinated blood antitoxin in one or various ways well known in the art. The hog cholera antitoxin, in serum form, no matter how obtained, is invariably contaminated in the course of manufacture, not only by bacteria but other organisms as well and at times a virus, as for example, foot-and-mouth disease virus. Up until the present time, phenol (carbolic acid) alone usually in the strength of 0.5% has been used as a preservative, which has in itself not proven entirely satisfactory in the control of bacteria in hog cholera antitoxin, defibrinated blood, plasma or serum and shown to be without any effect in safeguarding the product against a virus contamination, such as foot-and-mouth disease virus.

Dr. Marion Dorset, chief of the Biochemic Division of the Bureau of Animal Industry, Department of Agriculture, of the United States, at the nineteenth annual meeting of the United States Live Stock Sanitary Association, Chicago, Ill., December 2, 3, 1915, touched upon the necessity of safeguarding hog cholera antitoxin against foot-and-mouth disease virus as follows:—

"The recent outbreak of foot and mouth disease and the danger to serum plants from that source makes it most desirable to develop some system whereby hog cholera serum and virus can be rendered safe so far as foot and mouth disease is concerned. The tests of these two products on animals, while of undoubted value, are not absolute. As long as the tests are not, and that we feel they are not, then we must have some means by which the serum can be treated to destroy the foot and mouth infection in the serum that is present. Chemical disinfection seems to hold out little promise. They usually, in the presence of large quantities of albuminous matter, such as are present in serum, are not as active as they are under other conditions, and it probably would be necessary in order to be absolutely sure of destroying the foot and mouth virus, to add enough of the disinfectant to practically destroy the product. We, therefore, have turned to the use of physical agents.

"All authorities on foot and mouth disease state that the virus of foot and mouth disease is very susceptible to heat. Loeffler states that the virus is destroyed by heating for twelve hours at fifty degrees. Hutyra and Marek in their work on pathology state that virus is destroyed in fifteen minutes at fifty degrees. I don't know why there should be the great variation in the statements here, except that I imagine from the way the articles read, that Professor Loeffler merely heated at fifty degrees for twelve hours and did not attempt to test at the same temperature for a shorter period of time, and he simply states what he found.

"The question, however, came up whether hog-cholera serum could be heated successfully at a temperature high enough and a time long enough to destroy the foot and mouth virus. We attempted to heat this ordinary defibrinated blood at sixty degrees centigrade. There were two samples of serums heated for one-half hour at sixty degrees. There was one sample heated for one and one-half hours at sixty degrees. And there was one heated for six hours at fifty-five degrees. It was found that in all cases the serum thickened, that it was partially coagulated, and its physical qualities were very much impaired, although it was possible to get enough fluid from these partially coagulated products to inject pigs with them and attain the protective quality. It was found that the serum still protected pigs from hog cholera, although it seemed to be possibly very slightly potent. I am not quite sure even that that was true. It was slightly lower in potency for the higher temperatures. And then we, finding the difficulty in the physical condition of the serum with the higher temperatures, attempted to heat at fifty degrees. We heated one sample of serum for six hours at fifty degrees, one twenty-four hours at fifty degrees, and six different lots of serum for twelve hours at fifty degrees. We find that the serum at fifty degrees centigrade, even when heated for twenty-four hours, while it turns darker in color, is not otherwise materially altered in physical character. Unheated portions of this serum were reserved in all cases for comparison, to determine the relative potency. These heated serums, together with the unheated portions, were carefully tested by injection of susceptible pigs in doses of five, ten and fifteen c. c. against two c. c. of virus. It was impossible to find or to note any impairment in the potency of the serum heated for twelve hours, or even twenty-four hours, at fifty degrees centigrade. The serum did not seem to lose its potency, and was not injured in a physical way." (See *Report of the Nineteenth Annual Meeting of the United States Live Stock Sanitary Association*, Chicago, Illinois, December 2 and 3, 1915, page 72, paragraph 3, and page 73).

The substance quoted, taken from the published report of the meeting, was followed in the chronological order of date of publication, by a publication, entitled, "Production of Clear and Sterilized Anti-Hog-Cholera Serum, by M. Dorset and R. R. Henley," in the *Journal of Agricultural Research*, Vol. VI, No. 9, Department of Agriculture, Washington, D. C., May 29, 1916, page 333, in which a common white navy bean extract sodium chlorid method of preparing defibrinated blood for centrifugalizing in order to obtain therefrom the serum from hog cholera antitoxin defibrinated blood is described, and which serum so obtained is required subsequently to be heated to 60° C. for thirty minutes, and cooling, one part of a five per cent. solution of phenol should be added to nine parts of the serum. The exposure to 60° C. for thirty minutes is described as being sufficient to destroy any foot and mouth disease virus that may have been present. That exposure, however, we find is insufficient to kill all bacterial or other organism contamination, and only sufficient effectually to sterilize the product against foot and mouth disease virus, and besides, it is necessary in that method to heat or pasteurize the serum so obtained before the addition thereto of the phenol, which makes pasteurization in the final marketable container, without again exposing the product for the addition of the preservative, practically, if not absolutely, impossible.

In the Reichel and Werner specification of Letters Patent, 1,183,591, May 16, 1916, it is stated that: "We have discovered that coagulation may be entirely prevented and hemolysis inhibited by the use of a mixture of chemical reagents that will prevent coagulation, as for example, a solution of sodium citrate or ammonium oxalate and a solution of an aldehyde in the proper proportion, as for example, formaldehyde in 0.005 to 0.02 per cent." We have shown that the presence of this amount of the aldehyde is not sufficient to preserve the product or guard the product against contamination, and the product prepared in accordance with the specification of Patent No. 1,183,591 must subsequently be sterilized by filtration.

Recognizing the aldehydes, and formaldehyde in particular, as substances of antiseptic preservative and germicidal value, experiments were carried out to establish the phenol coefficient for formalin (35 to 40% water solution of the gaseous formaldehyde), which was demonstrated to be equal to and not exceeding that of phenol (C. P. carbolic acid). From this alone it could not be supposed that formalin would have any advantages as a preservative or antiseptic of hog cholera antitoxin serum over phenol. Experiments, however, with formalin on hog cholera antitoxin, defibrinated blood, plasma or serum prepared as previously described and in various other ways, and formalin led to the solution of the various problems:

1. Could an aldehyde be added without congealing, coagulating or changing the viscosity of hog cholera antitoxin, defibrinated blood, plasma or serum.

2. Would the aldehyde cause a precipitate when added to hog cholera antitoxin, defibrinated blood, plasma or serum.

3. Could an aldehyde be added to hog cholera antitoxin, defibrinated blood, plasma or serum, which when used would not prove injurious to animals.

4. Could sufficient aldehyde be added effectually to serve as a germicide, antiseptic, and preservative of hog cholera antitoxin defibrinated blood, serum or plasma.

5. Would the aldehyde effect the potency of hog cholera antitoxin, defibrinated blood, plasma or serum.

6. Could an aldehyde be added to hog cholera antitoxin at any time after the whole blood antitoxin is obtained without interfering with the subsequent treatment steps in the preparation of hog cholera antitoxin, defibrinated blood, plasma or serum.

The results of the experiments under the various problems led to the following disclosures:

1. Formalin (35 to 40% watery solution of the gaseous formaldehyde), could be added to the extent of not more than 0.5% to either freshly prepared or phenolized hog cholera antitoxin, defibrinated blood, plasma or serum without congealing, coagulating or noticeably changing the viscosity of the products.

2. The formalin could be added at any time without causing a precipitate to appear.

3. The treatment of hogs with formalized hog cholera antitoxin failed to show that the animals were discomforted or injured by the presence of the formalin.

4. Even though formalin does not show a phenol coefficient any higher than phenol, it serves better as a germicide in hog cholera antitoxin than phenol.

5. Formalin has no unfavorable influence on the potency of the product.

6. The addition of formalin at any time to hog cholera antitoxin has no unfavorable influence on the material in the subsequent treatment steps, but may assist in a beneficial way in some of the steps.

Aside from these disclosures, the further discoveries were made that hog cholera antitoxin defibrinated blood, plasma or serum, tinged with hemoglobulin is actually bleached to a considerable extent by the aldehyde; that an antitoxin product treated with all of the phenol that it will stand without causing physical changes will stand the addition of as much formalin as the unphenolized product; and that formalin will actually alter the coagulation point of hog cholera antitoxin so that the serum, with or without phenol, can subsequently be heated to 60° for thirty minutes or longer without coagulating any of the ingredients in the serum so as to render the heated product unfit for use. The addition of the aldehyde to the product in the process of manufacture, alone makes it possible to pasteurize the product in the final marketable container. It was also shown that it is necessary to heat the formalized product in sealed containers to prevent the loss of the gaseous formaldehyde.

E. W. Mumma and John Reichel (*Mulford's Veterinary Bulletin*, Vol. VII, No. 2, page 61, January 1916, published by H. K. Mulford Company, Philadelphia, Pennsylvania,), reported an experiment on the problem, "to determine the value of carbolic acid and trikresol in the preservation of hog cholera serum, defibrinated blood". In that report, aside from showing that phenol or trikresol are not effective preservatives for the product, it was conclusively shown that neither one could keep the bacteria in check and that no matter how long the phenol or trikresol were allowed to act they would not sterilize a contaminated product; but formalin compared with phenol or trikresol shows that the formalin will hold bacterial contamination in check and, in time, will actually sterilize a contaminated product.

In the process of manufacturing hog cholera antitoxin described in the Reichel and Werner Patent, 1,183,591, May 16, 1916, we included the use of an aldehyde—formalin—by adding sufficient formalin to bring the chemical up to 0.1% in the bulk stock of the product before heating. We usually allow a month to elapse after the treatment with formalin to allow the aldehyde to act on the ingredients of the product to change the coagulation point so that the product can be safely pasteurized or heated to 60° for thirty minutes.

Aside from changing the coagulation point, the formalin added will effectually sterilize the product, killing bacteria, foot-and-mouth disease virus and other organisms. Heating the formalized product in the final marketable container is not essential, but may be practised as an additional safeguard.

What we claim is:—

1. The process of treating hog cholera antitoxin, defibrinated blood, plasma or serum with a solution of an aldehyde, as for example, formaldehyde or formalin, of an amount substantially to serve as an antiseptic or preservative or germicide or sterilizer.

2. The manufacture of hog cholera antitoxin, the process of changing the coagulation point thereof by the adding thereto a solution of an aldehyde to the extent substantially of not more than 0.5 per cent. of the content as a whole, to serve as a germicide or sterilizer, and to prevent coagulation and to obtain sterility upon being heated to avoid contamination by foot-and-mouth disease virus.

3. In the art of the manufacture of hog cholera antitoxin treated with the usual preservatives, phenol or trikresol, the additional treatment step, of mixing with the antitoxin, a solution of an aldehyde, as for example, formaldehyde or formalin, to control contamination.

4. In the art of manufacturing hog cholera antitoxin for sale in a final marketable container, the step of mixing with the antitoxin a solution of an aldehyde, in form of formaldehyde or formalin, for example, and placing the antitoxin in the final marketable container, and heating the same therein to a sufficient length of time to kill the foot-and-mouth disease virus.

5. In the art of the manufacture of a phenolized hog cholera antitoxin, the step of compounding therewith a solution of an aldehyde to the extent of substantially 0.5% in the forms, for example, of formaldehyde or formalin, to serve substantially as an antiseptic, germicide or sterilizer.

6. In the art of the manufacture of hog cholera antitoxin, the step of compounding therewith substantially a 0.5 per cent. solution of an aldehyde, for examples, formaldehyde or formalin, contenting the said composition in its final container, and heating the composition while in the said container, to sterilize the antitoxin therein contained.

7. In the art of the manufacture of hog cholera antitoxin, the step of compounding therewith substantially a 0.5 per cent. solution of an aldehyde, for examples, formaldehyde or formalin, containing the said composition in its final container, sealing the same, and heating the composition while in the said container, to sterilize the antitoxin therein sealed.

8. As a new manufacture or substance, a composition of matter comprising hog cholera antitoxin and an aldehyde, for examples formaldehyde or formalin, to the extent substantially of a 0.5 per cent. solution.

9. As a new manufacture or substance, a composition of matter comprising hog cholera antitoxin, a preservative, for examples, phenol or trikresol, and substantially a 0.5 per cent. solution, of an aldehyde, for examples, formaldehyde or formalin.

10. As a new manufacture or substance, a composition of matter comprising hog cholera antitoxin, a preservative, for examples, phenol or trikresol, and substantially a 0.5 per cent. solution of an aldehyde, for examples, formaldehyde or formalin, and the composition subjected to heat to sterilize the antitoxin.

11. As a new manufacture or article, in its final sealed container, consisting of a composition of matter, comprising hog cholera antitoxin and substantially a 0.5 per cent. solution of formalin.

In testimony whereof, we have signed our names to this specification.

JOHN REICHEL.
HENRY WERNER.

Copies of this patent may be obtained for five cents each, by addressing the "Commissioner of Patents, Washington, D. C."